US012673512B2

(12) United States Patent
Takagi et al.

(10) Patent No.: US 12,673,512 B2
(45) Date of Patent: Jul. 7, 2026

(54) PRINTER

(71) Applicant: Toshiba Tec Kabushiki Kaisha, Tokyo (JP)

(72) Inventors: Yuki Takagi, Singapore (SG); Akira Suzuki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 64 days.

(21) Appl. No.: 18/789,577

(22) Filed: Jul. 30, 2024

(65) Prior Publication Data

US 2025/0091369 A1 Mar. 20, 2025

(30) Foreign Application Priority Data

Sep. 20, 2023 (JP) ................................ 2023-152241

(51) Int. Cl.

| | |
|---|---|
| ***B41J 15/04*** | (2006.01) |
| ***B41J 11/00*** | (2006.01) |
| ***B41J 11/04*** | (2006.01) |
| ***B41J 11/66*** | (2006.01) |
| ***B41J 11/70*** | (2006.01) |
| ***B41J 29/02*** | (2006.01) |

(Continued)

(52) U.S. Cl.

CPC ........... *B41J 15/042* (2013.01); *B41J 11/006* (2013.01); *B41J 11/04* (2013.01); *B41J 11/663* (2013.01); *B41J 11/666* (2013.01); *B41J 11/70* (2013.01); *B41J 11/706* (2013.01); *B41J 15/046* (2013.01); *B41J 29/02* (2013.01); *B41J 29/13* (2013.01); *B41J 29/46* (2013.01)

(58) Field of Classification Search

CPC ........ B41J 15/042; B41J 11/006; B41J 11/04; B41J 11/663; B41J 11/666; B41J 11/70; B41J 11/706; B41J 15/046; B41J 29/02; B41J 29/13; B41J 29/46

See application file for complete search history.

(56) References Cited

U.S. PATENT DOCUMENTS

2006/0171754 A1* 8/2006 Takami .................. B41J 11/006 400/613
2007/0036604 A1* 2/2007 Maekawa ................ B41J 29/13 400/615.2

(Continued)

FOREIGN PATENT DOCUMENTS

JP 1992182164 6/1992
JP H04-182164 A 6/1992

(Continued)

*Primary Examiner* — Henok D Legesse
(74) *Attorney, Agent, or Firm* — Kim & Stewart LLP

(57) ABSTRACT

A printer includes a body having an opening; a lid that is rotated to open and close the opening, a sheet discharge port being formed between the lid and the body when the lid is in a closed position; a printing mechanism; a first sensor that is disposed closer to a first end of the lid and is capable of detecting whether the first end of the lid is in the closed position; a movable part that is provided on one of the lid and the body and moves when pressed by a jammed sheet; and a second sensor that is provided on another one of the lid and the body at a position closer to a second end of the lid to detect the movable part and is capable of detecting that the second end is not in the closed position and the movable part is moved.

20 Claims, 14 Drawing Sheets

(51) Int. Cl.
*B41J 29/13* (2006.01)
*B41J 29/46* (2006.01)

(56) References Cited

U.S. PATENT DOCUMENTS

| | | | | |
|---|---|---|---|---|
| 2009/0022536 | A1* | 1/2009 | Takeshita | B41J 11/006 400/617 |
| 2013/0056512 | A1* | 3/2013 | Suzuki | B41J 15/042 226/196.1 |
| 2013/0258023 | A1* | 10/2013 | Sekino | B41J 2/32 347/104 |
| 2020/0230980 | A1 | 7/2020 | Tokuda et al. | |

FOREIGN PATENT DOCUMENTS

| | | | |
|---|---|---|---|
| JP | 2020-116777 | A | 8/2020 |
| JP | 6902884 | | 7/2021 |
| JP | 6902884 | B2 | 7/2021 |

* cited by examiner

PRINTER

CROSS-REFERENCE TO RELATED APPLICATION(S)

This application is based upon and claims the benefit of priority from Japanese Patent Application No. 2023-152241, filed Sep. 20, 2023, the entire contents of which are incorporated herein by reference.

FIELD

Embodiments described herein relate generally to a printer.

BACKGROUND

Conventionally, since a printer requires various types of maintenance, such as clearing a paper jam and replenishing paper sheets, an opening is provided in a part of a housing of the printer to expose the inside of the housing. The opening is opened and closed with a lid. Any number of necessary openings may be formed in appropriate positions.

The printer with an opening includes sensors, such as a sensor for determining whether the lid is properly closed and a sensor for determining the occurrence of a paper jam. If it is possible to provide a sensor for every necessary part to be detected, desired determination can be performed accurately. However, as the number of sensors increases, component cost increases, the load of, for example, assembly increases, and it becomes difficult to reduce the price of the printer.

SUMMARY OF THE INVENTION

An embodiment of the present disclosure provides a printer having a configuration that makes it possible to reduce the number of sensors in the printer while improving the accuracy of desired determination.

According to an aspect of the present disclosure, a printer comprises a body including a holder that holds a strip-shaped sheet and having an opening; a lid one side of which is rotatably supported along an edge of the opening and that is rotated to open and close the opening, a sheet discharge port being formed between the lid and a part of the body when the lid is in a closed position to close the opening, the lid having a first end and a second end opposite the first end in a width direction of the lid; a printing mechanism that performs printing on the sheet; a first sensor that is disposed closer to the first end of the lid than to the second end of the lid and is capable of detecting whether the first end of the lid is in the closed position; a movable part that is provided on one of the lid and the body and moves when pressed by the sheet jammed in a section between the printing mechanism and the sheet discharge port; and a second sensor that is provided on another one of the lid and the body at a position closer to the second end of the lid than to the first end of the lid and is capable of detecting that the second end of the lid is not in the closed position and the movable part is moved.

DETAILED DESCRIPTION

Hereinafter, an embodiment of the present disclosure will be described in detail with reference to the drawings. The present disclosure is not limited to the embodiment described below.

Figure 1:
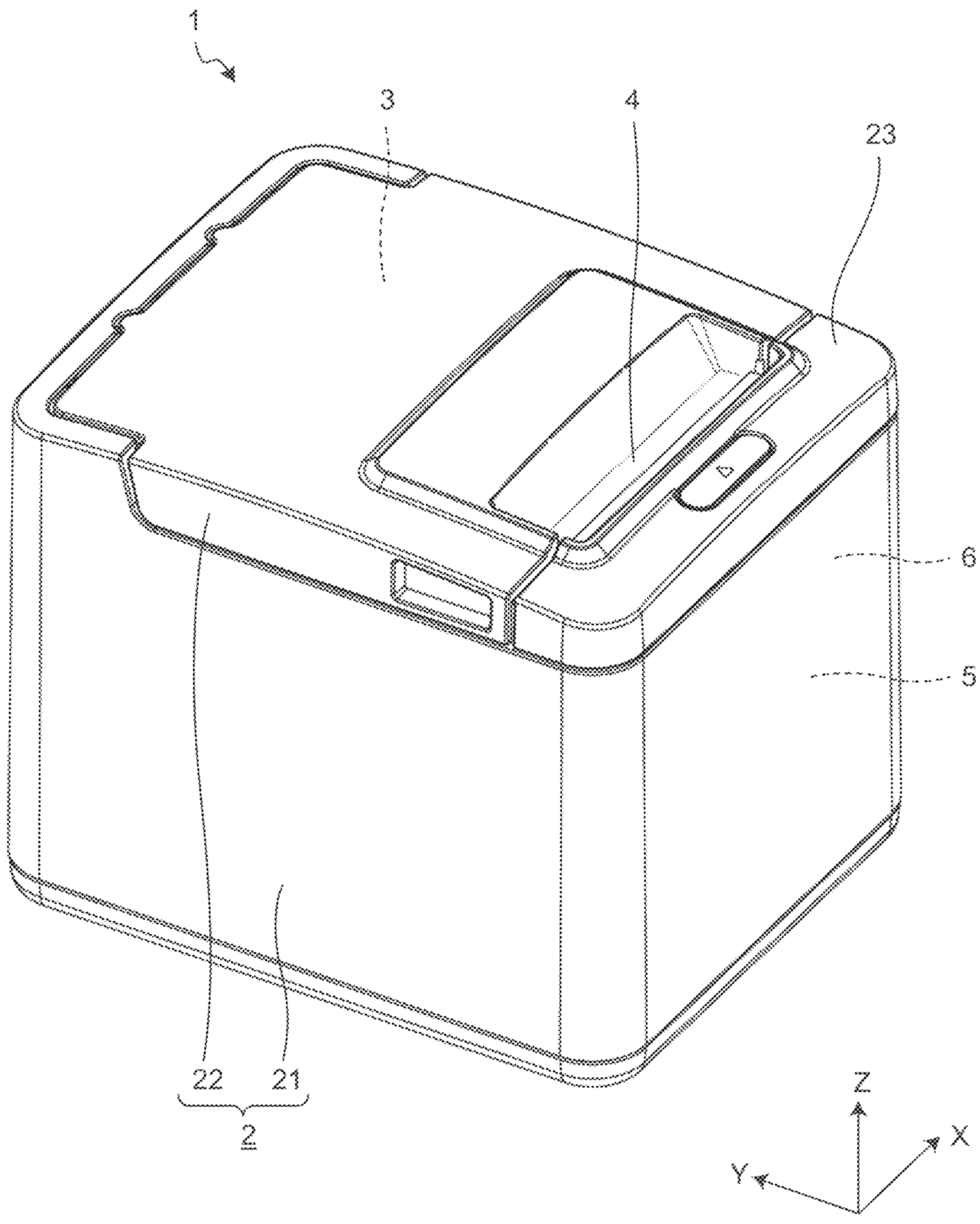
FIG. 1 is a perspective view of an external appearance of a printer according to an embodiment.
Figure 2:
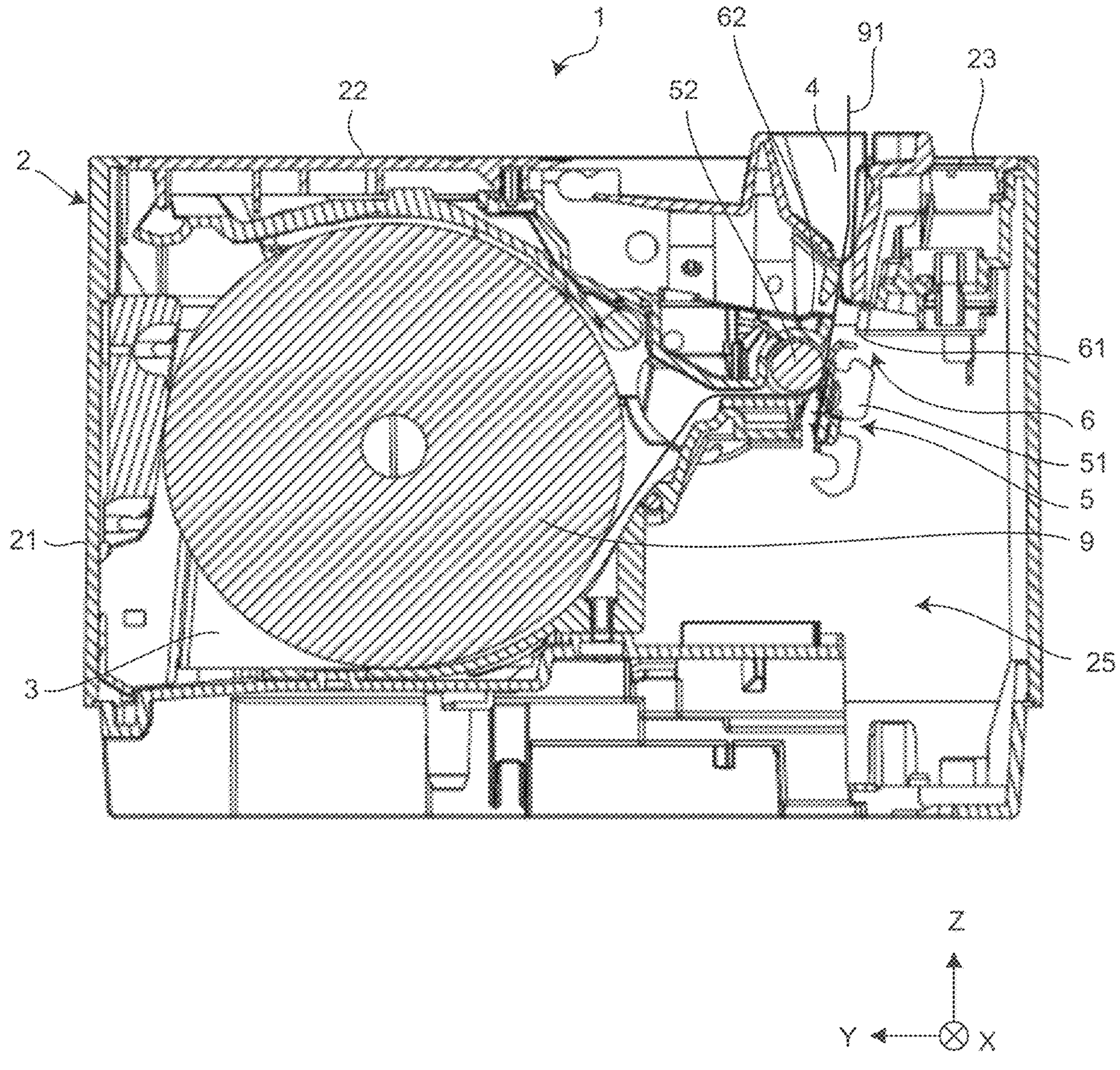
FIG. 2 is a schematic cross-sectional view of an internal structure of the printer according to the embodiment.

FIG. 1 is a perspective view of an external appearance of a printer 1 according to the embodiment. FIG. 2 is a schematic cross-sectional view of an internal structure of the printer 1.

In the drawings, directions are indicated by an X-axis, a Y-axis, and a Z-axis that are orthogonal to each other. An X-axis direction is along the left-right direction (or the width direction) of the printer 1, and a direction from the left side to the right side in the front view of the printer 1 is referred to as a positive X-axis direction. A Y-axis direction is along the front-rear direction (or the depth direction) of the printer 1, and a direction from the front side to the back side of the printer 1 is referred to as a positive Y-axis direction. A Z-axis direction is along the vertical direction (or the height direction) of the printer 1, and a direction from the lower side to the upper side of the printer 1 is referred to as a positive Z-axis direction.

The printer 1 is, for example, a thermal printer, and prints information such as characters and images on a sheet. The printer 1 is connected to, for example, a Point-of-Sale (POS) terminal (not shown), receives information, such as item information and sales information related to items sold to customers at a store, from the POS terminal, prints the received information on a sheet, and issues the sheet as a receipt (discharges the sheet).

The printer 1 includes a housing 2, a holder 3, a sheet discharge port 4, a printing unit 5, and a cutting unit 6.

The housing 2 includes a body 21, a first lid 22, and a second lid 23. The body 21 is a container on one side of which openings are formed and includes the holder 3 that holds a rolled sheet 9. Each of the first lid 22 and the second lid 23 is an example of a lid one side of which is rotatably supported by an edge of an opening and that is rotated to open and close the opening. The lid has a first end and a second end opposite the first end in the width direction of the lid. The sheet discharge port 4 is formed between the lid and another component of the printer 1 when the lid is in a closed position to close the opening.

Figure 3:
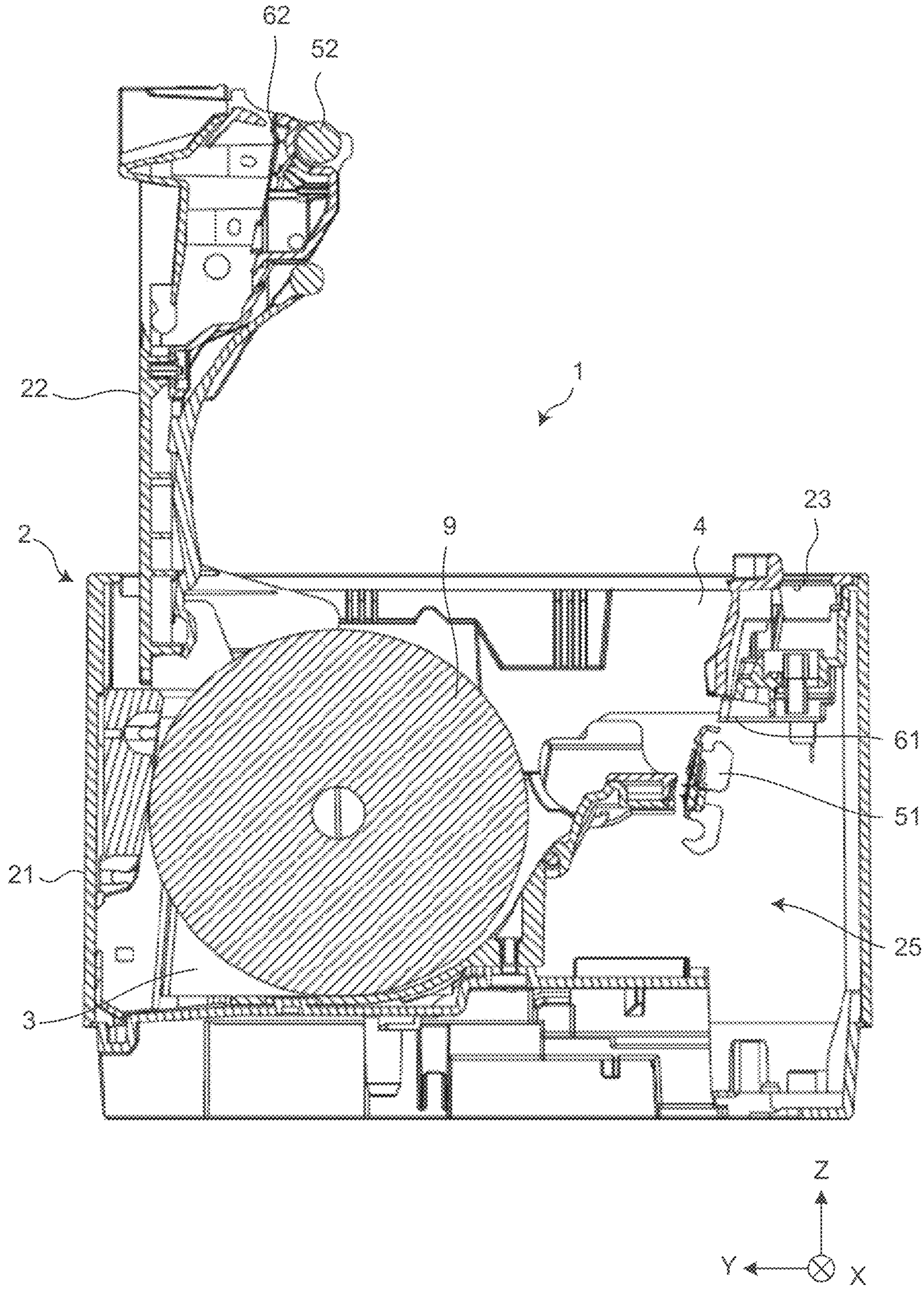
FIG. 3 is a diagram illustrating a state in which a lid is in a position to open a holder.

One side of the first lid 22 is rotatably supported by an edge of a first opening of the body 21. This side of the first lid 22 is referred to as a rotating side. The first opening of the body 21 is opened and closed by rotating the first lid 22, and the holder 3 is thereby opened and closed. Here, FIG. 3 is a diagram illustrating a state in which the first lid 22 is in a position to open the holder 3. The rolled sheet 9 is placed in and taken out of the body 21 in a state where the first lid 22 is open. One side of the second lid 23 is rotatably supported by an edge of a second opening of the body 21. The second opening of the body 21 is opened and closed by the second lid 23.

The rolled sheet 9 is formed by winding a strip-shaped sheet (for example, a heat-sensitive sheet) 91, and the sheet 91 is drawn out from the outer end of the rolled sheet 9. The outer diameter of the rolled sheet 9 gradually decreases as the sheet 91 is drawn out. The rolled sheet 9 is stored in the holder 3 in such an orientation that the width direction of the sheet 91 is aligned with the X-axis direction.

The printer 1 prints information on the sheet 91 drawn out from the rolled sheet 9 stored in the holder 3, and discharges the sheet 91 that has passed through the printing unit 5 from the sheet discharge port 4.

The sheet discharge port 4 is formed between a side of the first lid 22, which is opposite the rotating side, and the second lid 23. The sheet discharge port 4 faces upward, and the printer 1 discharges the sheet 91, which has passed through the printing unit 5, in an upward direction.

Figure 4:
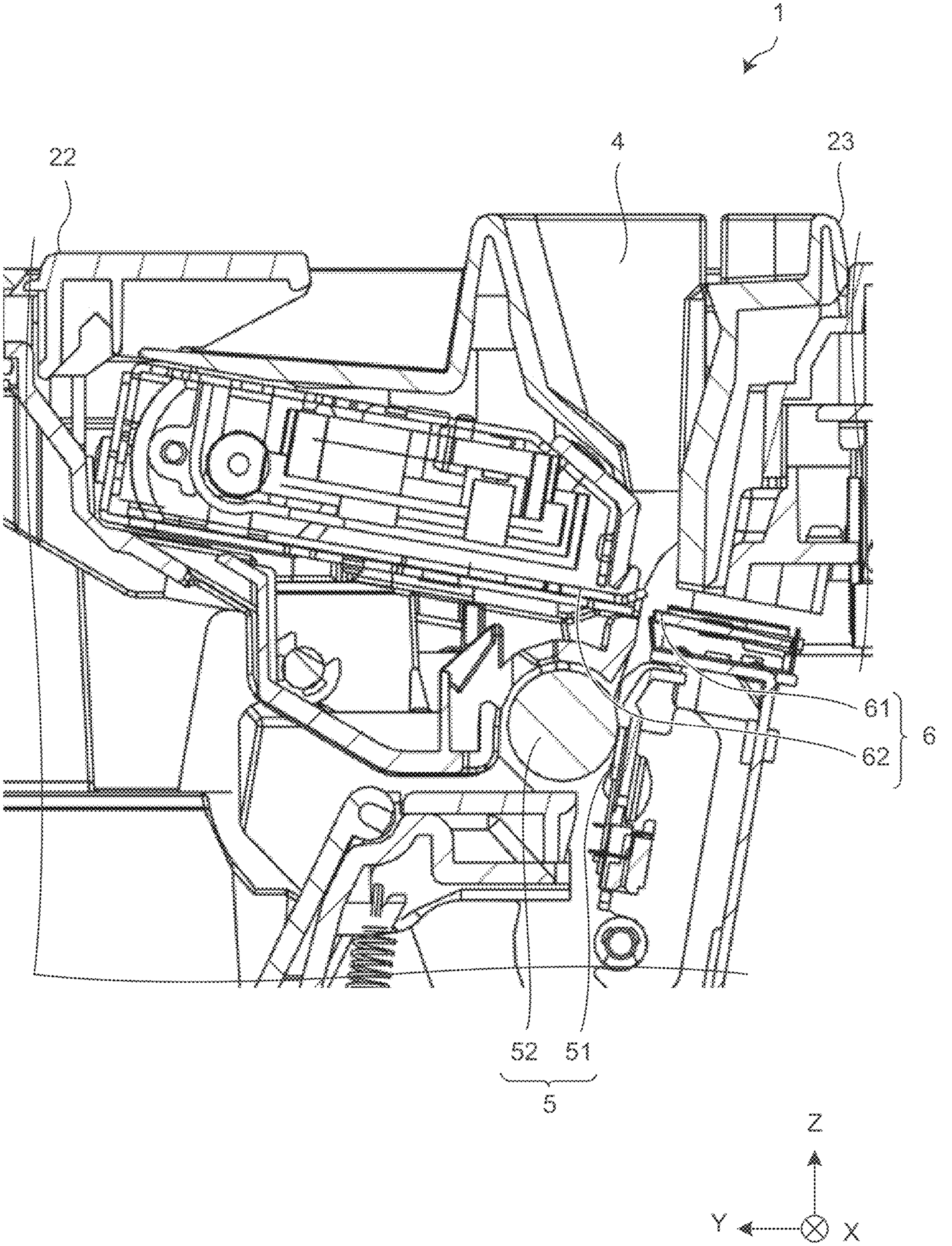
FIG. 4 is an enlarged view of a printing unit and a cutting unit according to the embodiment.

FIG. 4 is an enlarged view of the printing unit 5 and the cutting unit 6. The printing unit 5 includes a print head 51 and a platen 52. The printing unit 5 is an example of a printing mechanism.

The print head 51 is disposed in the body 21 in a substantially intermediate position between the holder 3 and the sheet discharge port 4 and is located in the conveyance path of the sheet 91 drawn out from the rolled sheet 9. The print head 51 is a line thermal head in which a large number of heating elements are arranged in a line. The print head 51 generates heat by driving one or more of the heating elements corresponding to a printing pattern and thereby applies heat to the sheet 91 to print information. The sheet 91 on which information has been printed is discharged from the sheet discharge port 4 to the outside of the housing 2.

The platen 52 is a cylindrical roller at least a surface of which is formed of an elastic material, and is rotatably attached to the first lid 22. When the first lid 22 is in the closed position to close the opening of the body 21, the platen 52 is placed in a position facing the print head 51 and presses the print head 51. In this state, the sheet 91 drawn out from the rolled sheet 9 is sandwiched between the print head 51 and the platen 52. The platen 52 is rotated by a driving force transmitted from a conveyance motor 53 (see FIG. 8, which will be described later), draws out the sheet 91 from the rolled sheet 9, and conveys the sheet 91 toward the sheet discharge port 4.

The cutting unit 6 is disposed between the printing unit 5 and the sheet discharge port 4 and cuts the sheet 91 along the width direction of the sheet 91. The cutting unit 6 is an example of a cutting mechanism. A sheet width direction, a sheet thickness direction, and a sheet conveyance direction of the sheet 91 are orthogonal to each other.

The cutting unit 6 is driven in a selected one of two cutting modes. In a first mode, which is also called a full-cut mode, a portion of the sheet 91 is completely cut off along the width direction. In a second mode, which is also called a partial-cut mode, a portion of the sheet 91 is partially cut off such that the portion remains attached to the rest of the sheet 91 in the middle in the width direction.

The cutting unit 6 includes, for example, a fixed blade 61 and a movable blade 62. The fixed blade 61 has a linear cutting edge along the X-axis direction. The movable blade 62 is disposed to face the cutting edge of the fixed blade 61, and has a V-shaped cutting edge whose central portion is recessed in a V-shape.

The movable blade 62 is driven by a cutting motor 63 (see FIG. 8, which will be described later) to move the cutting edge of the movable blade 62 toward and away from the cutting edge of the fixed blade 61. The cutting motor 63 is an example of a motor. For example, the moving direction of the movable blade 62 substantially matches the sheet thickness direction. In the state shown in FIG. 4, the movable blade 62 is positioned away from the fixed blade 61. The movable blade 62 is movable toward the fixed blade 61 to cut the sheet 91. In other words, a control unit 110 (or a processor described later) is configured to control the cutting motor 63 to move the movable blade 62 toward the fixed blade 61 to cut the sheet 91.

With the above configuration, the full-cut mode or the partial-cut mode can be selectively used by changing the moving distance of the movable blade 62 relative to the fixed blade 61. That is, the cutting unit 6 can be driven in the partial-cut mode by stopping the movable blade 62 at a position at which the valley of the V-shape of the movable blade 62 does not reach and is slightly away from the cutting edge of the fixed blade 61 so that the central portion in the width direction of the sheet 91 remains uncut. In other words, a control unit 110 (or a processor described later) is configured to control the cutting motor 63 to drive the cutting unit 6 in one of the full-cut mode and the partial-cut mode.

Figure 5:
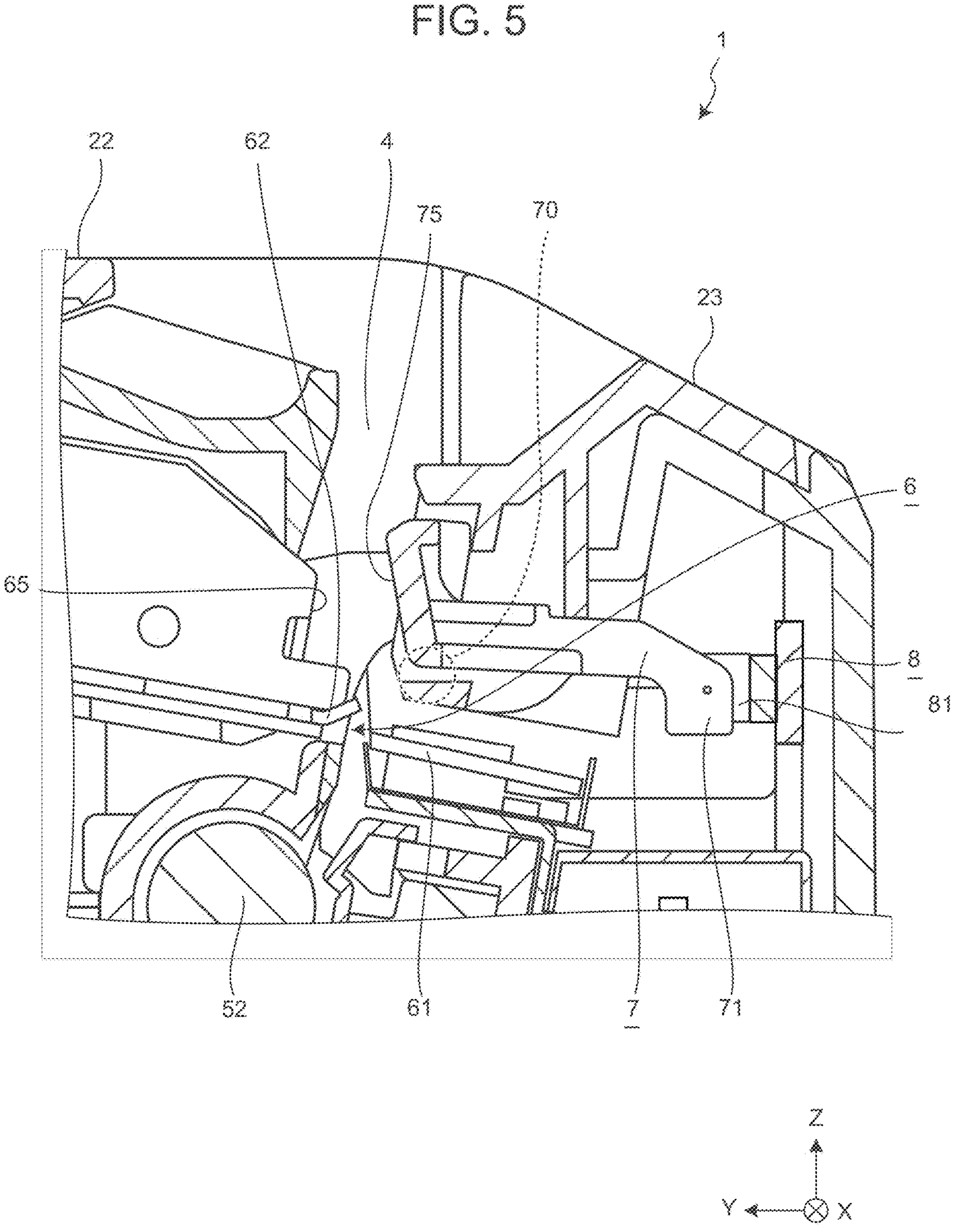
FIG. 5 is a diagram for describing a movable part and a dual-purpose sensor according to the embodiment.
Figure 6:
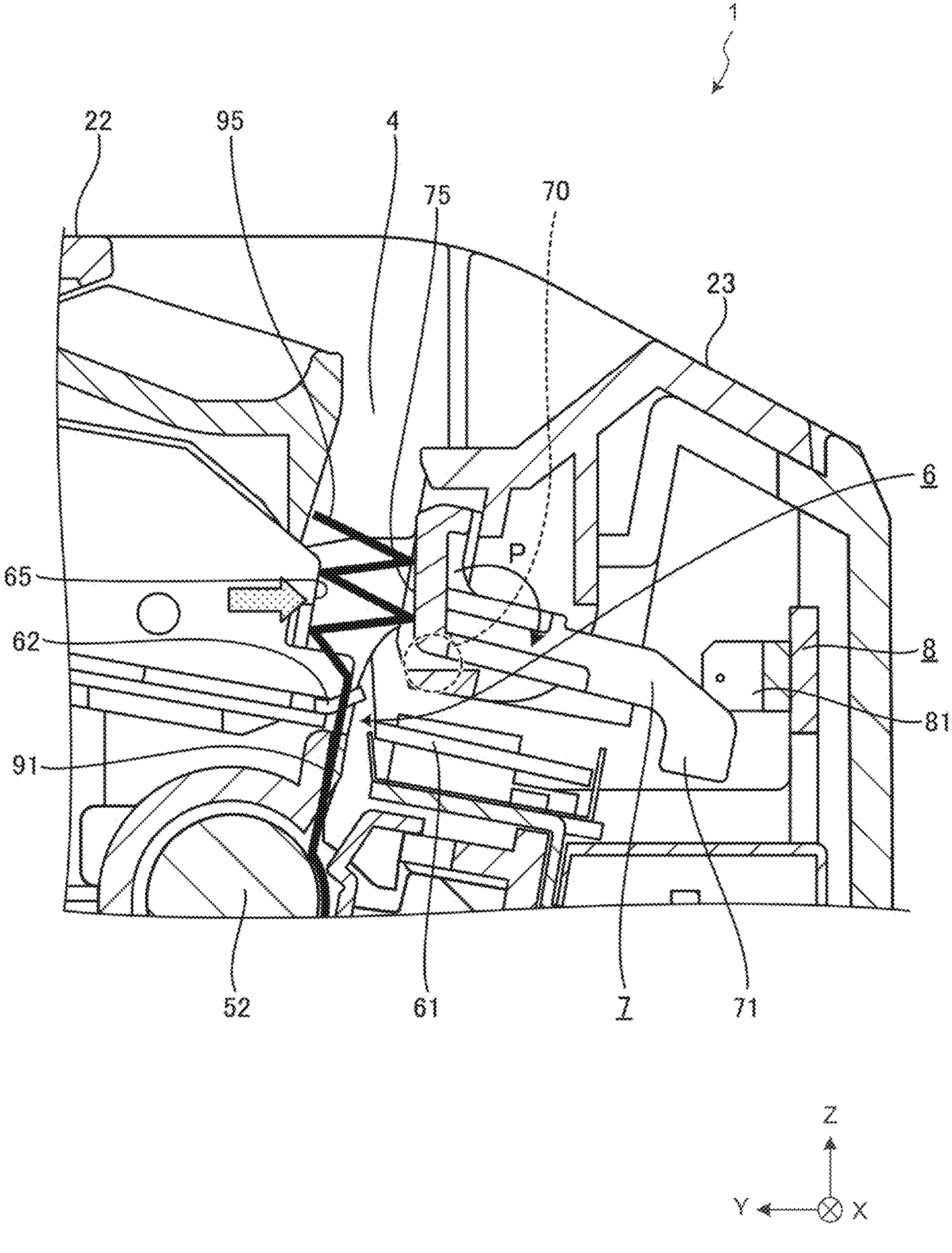
FIG. 6 is a diagram for describing the movable part and the dual-purpose sensor according to the embodiment.

FIG. 5 and FIG. 6 are diagrams for describing a movable part 7 and a dual-purpose sensor 8. The printer 1 further includes the movable part 7 and the dual-purpose sensor 8 (an example of a second sensor). Note that FIG. 6 shows a state in which a paper jam has occurred in the vicinity of the cutting unit 6. A reference number 95 indicates a jammed sheet.

The dual-purpose sensor 8 is provided on the inner side of the body 21. An output of the dual-purpose sensor 8 is used both for the determination of a paper jam and the determination of the position of the second lid 23. The dual-purpose sensor 8 is a general light transmission sensor (or a photoelectric sensor) and includes a light emitter and a light receiver that face each other across a slit 81. The light emitter includes a light source such as a Light Emitting Diode (LED) and emits light. The light receiver receives the light emitted by the light emitter. A fin 71 of the movable part 7 can enter and exit the slit 81.

The movable part 7 is provided on the inner side of the second lid 23. The movable part 7 rotates when pressed by the jammed sheet 95 jammed in a section between the printing unit 5 and the sheet discharge port 4.

Alternatively, the movable part 7 may be provided on the body 21, and the dual-purpose sensor 8 may be provided on the second lid 23.

The movable part 7 extends in the sheet width direction (or the X-axis direction) and includes the fin 71 that is located near the right end or the left end of the movable part 7 and is detected by the dual-purpose sensor 8. The second lid 23 includes a fin (not shown) that is located near the farther end of the second lid 23 relative to the fin 71 and is detected by an open/close sensor 105 (see FIG. 8) which will be described later. In other words, the second lid 23 includes the fin that is located closer to the first end of the second lid 23 than to the second end and to be detected by the open/close sensor 105, and the movable part 7 includes the fin 71 that is located closer to the second end of the second lid 23 than to the first end and to be detected by the dual-purpose sensor 8. Each of the fins is an example of a detection part.

The movable part 7 includes a rotation shaft 70 around which the movable part 7 rotates and a sheet guide 75 that guides the sheet 91. The sheet guide 75 extends in the sheet width direction (or the X-axis direction) and preferably has a length greater than or equal to the maximum width of the sheet 91. The rotation shaft 70 is located below the sheet guide 75, is provided at each of the left and right ends of the movable part 7, and is rotatably supported by the second lid 23. As the movable part 7 rotates, the fin 71 moves in and out of the slit 81 of the dual-purpose sensor 8.

When a paper jam occurs in the cutting unit 6 (see FIG. 6), the sheet guide 75 is pressed by the jammed sheet 95, and the movable part 7 rotates. As a result, the state and the output of the dual-purpose sensor 8 change. In this example, since the rotation shaft 70 is located below the sheet guide 75, the rotation direction is a clockwise direction (indicated by an arrow P) in FIG. 6. In order to remove the jammed sheet 95, the second lid 23 is moved to open the space above the fixed blade 61.

The second lid 23 functions as a cover that covers the fixed blade 61 and the movable blade 62 sliding over the fixed blade 61 and is placed in a position (or a closed position) to cover the fixed blade 61 from above. The second lid 23 can be opened and closed as necessary when, for example, a paper jam occurs.

Figure 7:
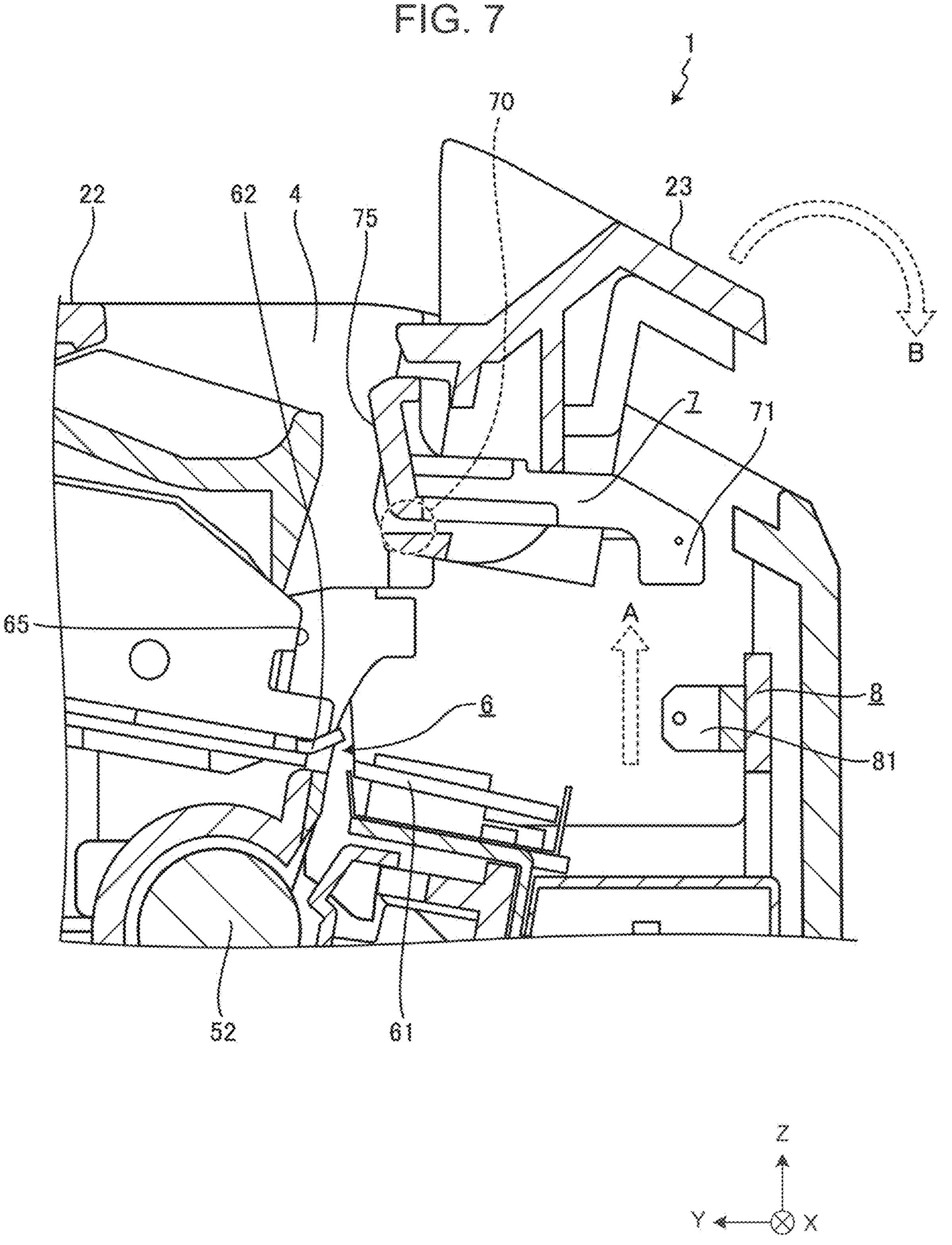
FIG. 7 is a diagram illustrating a second lid being moved according to the embodiment.

FIG. 7 is a diagram illustrating a state in which the second lid 23 is being moved. When it is necessary to open (or move) the second lid 23, the user of the printer 1 moves the second lid 23 as indicated by arrows A and B. That is, the user of the printer 1 pulls the second lid 23 upward (in the positive Z-axis direction) and then rotates the second lid 23 around a rotation shaft extending in the X-axis direction to tilt the second lid 23 toward the front side of the printer 1. As a result, the space above the fixed blade 61 is opened.

After removing the jammed sheet 95, the user returns the second lid 23 to the closed position. In the present embodiment, when the second lid 23 is in the closed position (a position covering the fixed blade 61) and there is no paper jam, the fin 71 is positioned in the slit 81 and blocks the light emitted from the light emitter toward the light receiver. Accordingly, the dual-purpose sensor 8 is in a "non-detection (off or light-shielding) state" in which light is not detected. The non-detection state of the dual-purpose sensor 8 indicates that the neighborhood of the cutting unit 6 is in a normal state.

The opposite of the normal state is an abnormal state. When the fin 71 is not present in the slit 81, the dual-purpose sensor 8 is in a "detection (on or light transmitting) state" in which the light receiver detects light. The detection state of the dual-purpose sensor 8 indicates that the neighborhood of the cutting unit 6 is in an abnormal state. The abnormal state indicates, for example, a paper jam, misalignment of the second lid 23, or the open state of the second lid 23. In other words, the dual-purpose sensor 8 outputs a signal indicating either a normal state or an abnormal state.

Figure 8:
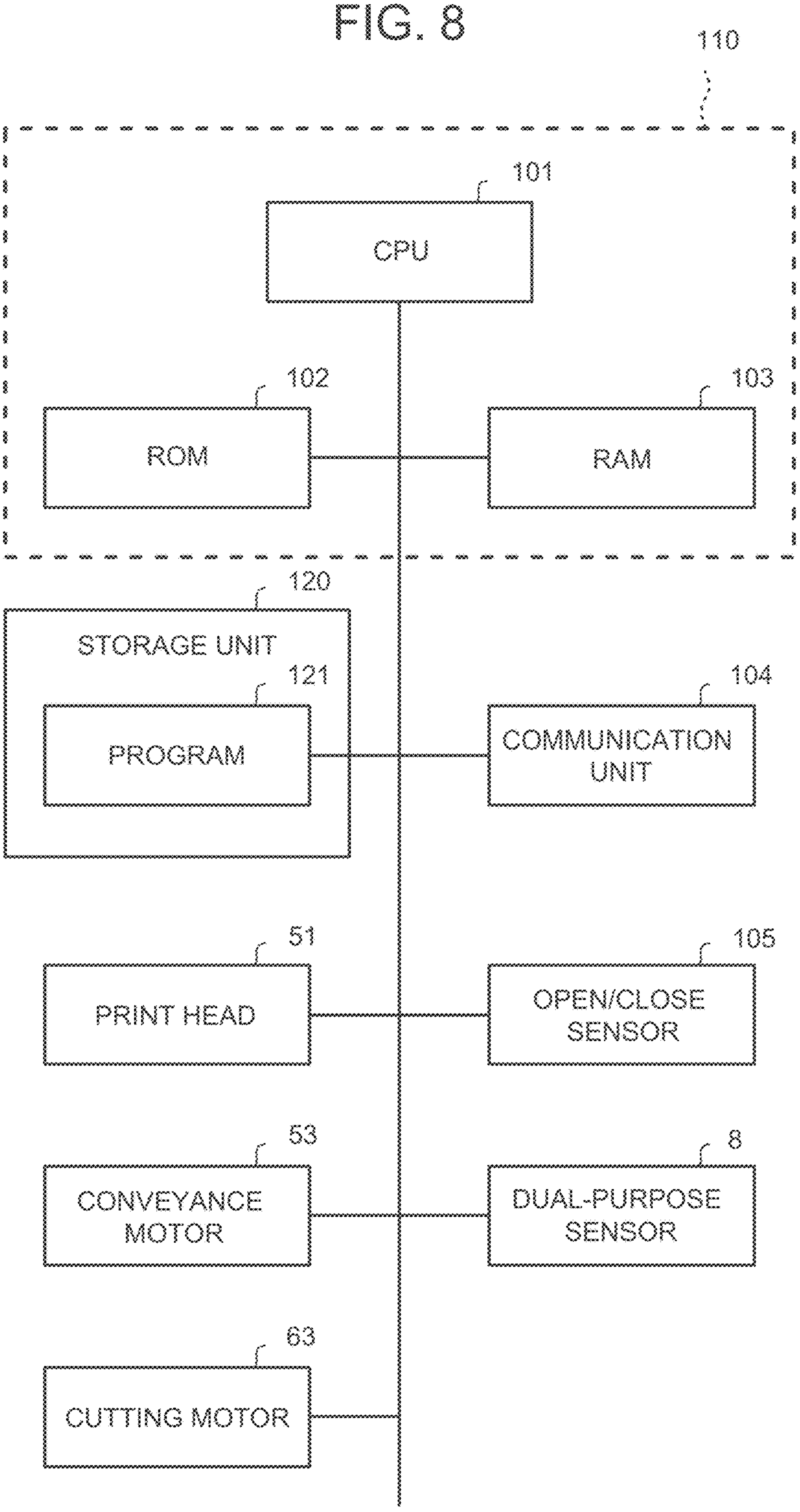
FIG. 8 is a diagram illustrating electronic components included in the printer according to the embodiment.

FIG. 8 is a diagram illustrating electronic components included in the printer 1. The printer 1 further includes a Central Processing Unit (CPU) 101, a Read-Only Memory (ROM) 102, a Random Access Memory (RAM) 103, a communication unit 104, an open/close sensor 105, and a storage unit 120. The CPU 101, the ROM 102, the RAM 103, the communication unit 104, the open/close sensor 105, the storage unit 120, the dual-purpose sensor 8, the print head 51, the conveyance motor 53, and the cutting motor 63 are connected to be able to communicate with each other.

The CPU 101 is an example of a processor and controls the other components of the printer 1. The ROM 102 stores various programs. The RAM 103 is a workspace into which programs and various types of data are loaded. The CPU 101, the ROM 102, and the RAM 103 are connected to each other via, for example, a bus and constitute a control unit 110 of the printer 1.

The communication unit 104 is a communication interface for connecting the control unit 110 to an external device via a network for communication.

The open/close sensor 105 (an example of a first sensor) outputs a signal used to determine whether one of the ends of the second lid 23 is in a closed position. The open/close sensor 105 is provided on the inner side of the body 21. The open/close sensor 105 detects a fin of the second lid 23 when the second lid 23 is in the closed position. The open/close sensor 105 is used to determine whether the second lid 23 is properly closed (or placed in the closed position). In other words, the open/close sensor 105 outputs a signal indicating whether the first end of the second lid 23 is in the closed position.

The open/close sensor 105 is a general light transmission sensor similar to the dual-purpose sensor 8 and includes a light emitter and a light receiver that face each other across a slit. The light emitter includes a light source such as an LED and emits light. The light receiver receives the light emitted by the light emitter. The fin of the second lid 23 can enter and exit the slit. Note that the fin of the second lid 23 is located near the farther end of the second lid 23 relative to the fin 71.

The storage unit 120 is an example of a storage device and includes a non-volatile storage medium, such as a flash memory, that retains information even if the power supply is cut off. The storage unit 120 stores programs to be executed by the CPU 101 and various types of setting information.

In the control unit 110, the CPU 101 performs various processes in accordance with programs that are stored in the ROM 102 and the storage unit 120 and loaded into the RAM 103. With this configuration, the control unit 110 implements various functional units.

Figure 9:
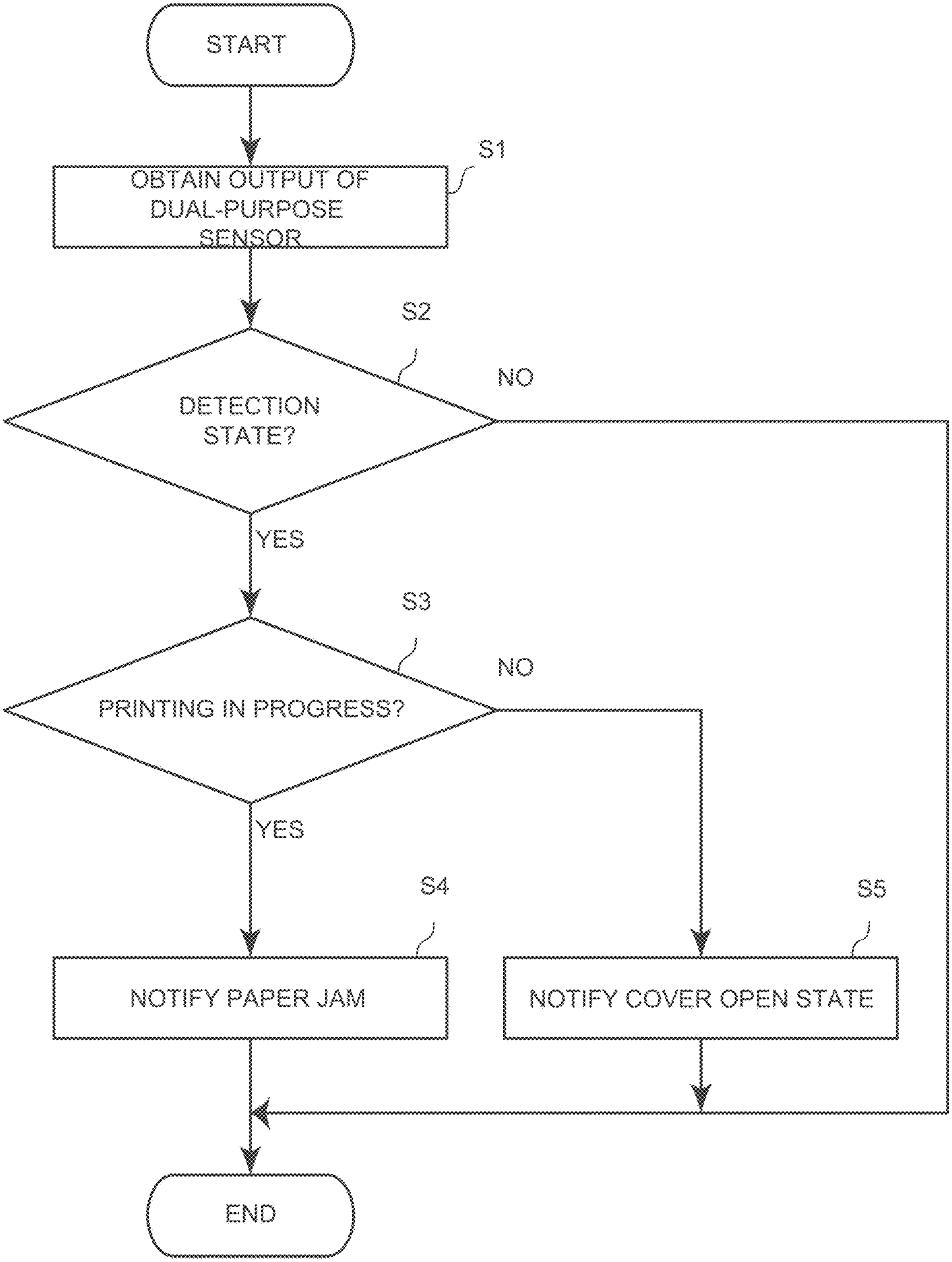
FIG. 9 is a flowchart illustrating a process performed by functions of a control unit according to the embodiment.

FIG. 9 is a flowchart illustrating a process performed by functions of the control unit 110. For example, this process is performed immediately after the power of the printer 1 is turned on, immediately before the start of printing, or during printing.

First, an acquiring unit implemented by the control unit 110 obtains an output of the dual-purpose sensor 8 (step S1). Next, a determining unit implemented by the control unit 110 determines whether the output indicates the detection state (the on, light transmitting, or abnormal state) (step S2). When the output of the dual-purpose sensor 8 indicates the non-detection state (the off, light shielding, or normal state) at step S2 (No at step S2), the control unit 110 ends the process.

When the output of the dual-purpose sensor 8 indicates the detection state at step S2 (Yes at step S2), the control unit 110 determines whether printing is in progress (step S3). When printing is in progress (Yes at step S3), the control unit 110 determines that a paper jam has occurred and notifies the paper jam (step S4).

On the other hand, when the printing is not in progress at step S3 (No at step S3), the control unit 110 determines that the second lid 23 is open or misaligned, and a notification unit implemented by the control unit 110 notifies that the second lid 23 is open or misaligned (i.e., not in the closed position) (which is referred to as a "cover open state") (step S5). Here, the paper jam or the cover open state may be notified by using, for example, a display device, an indicator, such as an LED, or a sound device, such as a buzzer, included in the printer 1. Each of the display device, the indicator, and the sound device is an example of a notification device. In other words, the control unit 110 is configured to control the notification device to notify the paper jam or that the second end of the second lid 23 is not in the closed position.

As described above, in the present embodiment, the second lid 23 has a first end and a second end opposite the first end in the width direction of the second lid 23. The open/close sensor 105 (or the first sensor) is disposed closer to the first end of the second lid 23 than to the second end and outputs a signal indicating whether the first end of the second lid 23 is in the closed position. The dual-purpose sensor 8 (or the second sensor), which is originally a sensor for detecting a paper jam, is disposed closer to the second end of the second lid 23 than to the first end and is also used to detect the movable part 7 and thereby detect whether the second end of the second lid 23 is in the closed position. Therefore, according to the configuration of the present embodiment, it is possible to determine whether both ends of the second lid 23 are positioned correctly.

For example, if only an output of a sensor (the open/close sensor 105) for detecting one end in the width direction of the second lid 23 is used to determine whether the second lid 23 is in the correct closed position, the second lid 23 may be determined to be in the correct closed position even if the other end in the width direction of the second lid 23 is loose (that is, not in the correct closed position).

Therefore, in the present embodiment, the second end of the second lid 23, at which the open/close sensor 105 is not provided, is detected by the dual-purpose sensor 8.

Thus, according to the present embodiment, it is possible to provide the printer 1 having a configuration that makes it possible to reduce the number of sensors provided in the printer 1 while improving the accuracy of desired determination (for example, determination of the position of the second lid 23).

It should be noted that the above-described embodiment can be modified as appropriate by changing a part of the configurations or functions of the above-described apparatus. Therefore, in the following, some variations of the above-described embodiment will be described as other embodiments. Note that, in the following, differences from the above-described embodiment will be mainly described, the same reference numerals are used for the same components as those in the above embodiment, and detailed descriptions the same components will be omitted. Furthermore, the variations described below may be implemented individually or in any appropriate combination.

First Variation

Figure 10:
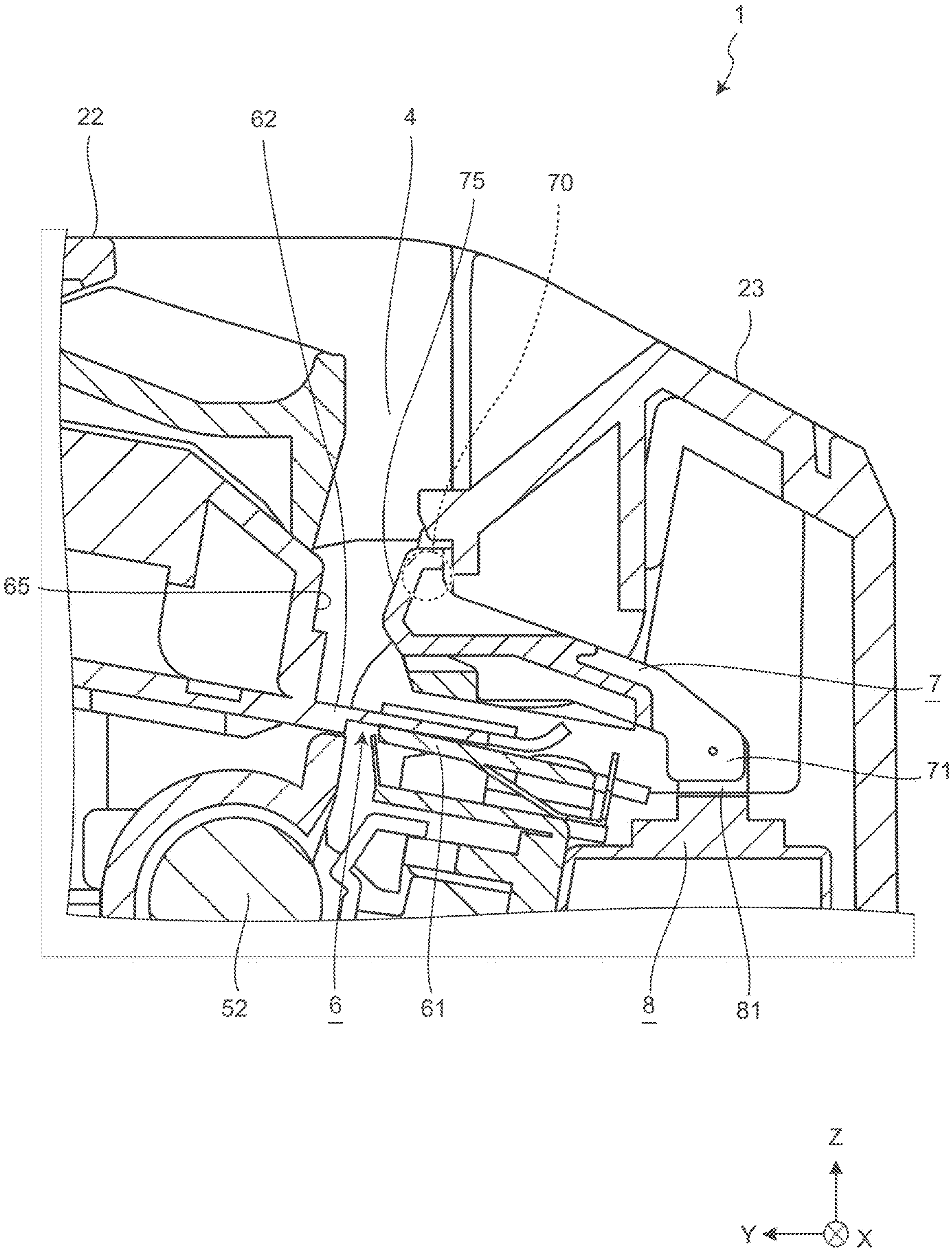
FIG. 10 is a diagram for describing a movable part and a dual-purpose sensor according to a first variation of the embodiment.
Figure 11:
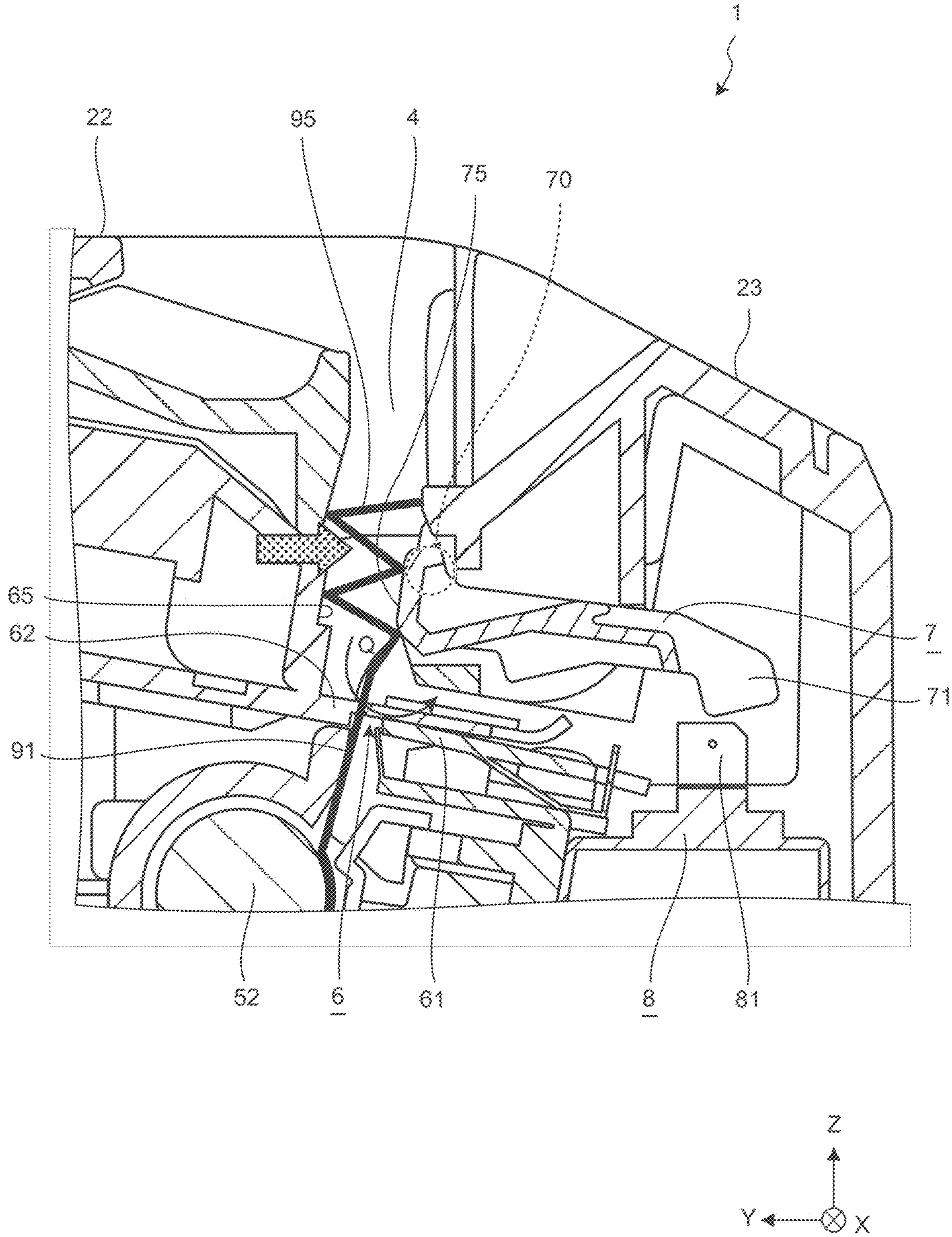
FIG. 11 is a diagram for describing the movable part and the dual-purpose sensor according to the first variation of the embodiment.

FIG. 10 and FIG. 11 are diagrams for describing the movable part 7 and the dual-purpose sensor 8 according to a first variation of the embodiment. FIG. 11 shows a state in which a paper jam has occurred in the vicinity of the cutting unit 6.

The rotation shaft 70 of the first variation is positioned above the sheet guide 75. Also, in the dual-purpose sensor 8 of the first variation, the opening of the slit 81 faces upward.

When a paper jam occurs in the cutting unit 6 (see FIG. 11), the sheet guide 75 is pressed by the jammed sheet 95, and the movable part 7 rotates.

In this variation, since the rotation shaft 70 is positioned above the sheet guide 75, the rotation direction is a counterclockwise direction (indicated by an arrow Q) in FIG. 11. The fin 71 of the first variation moves upward when the movable part 7 is pressed by the jammed sheet 95.

According to the configuration of the first variation described above, it is possible to obtain the same effects as those of the above embodiment.

Second Variation

Figure 12:
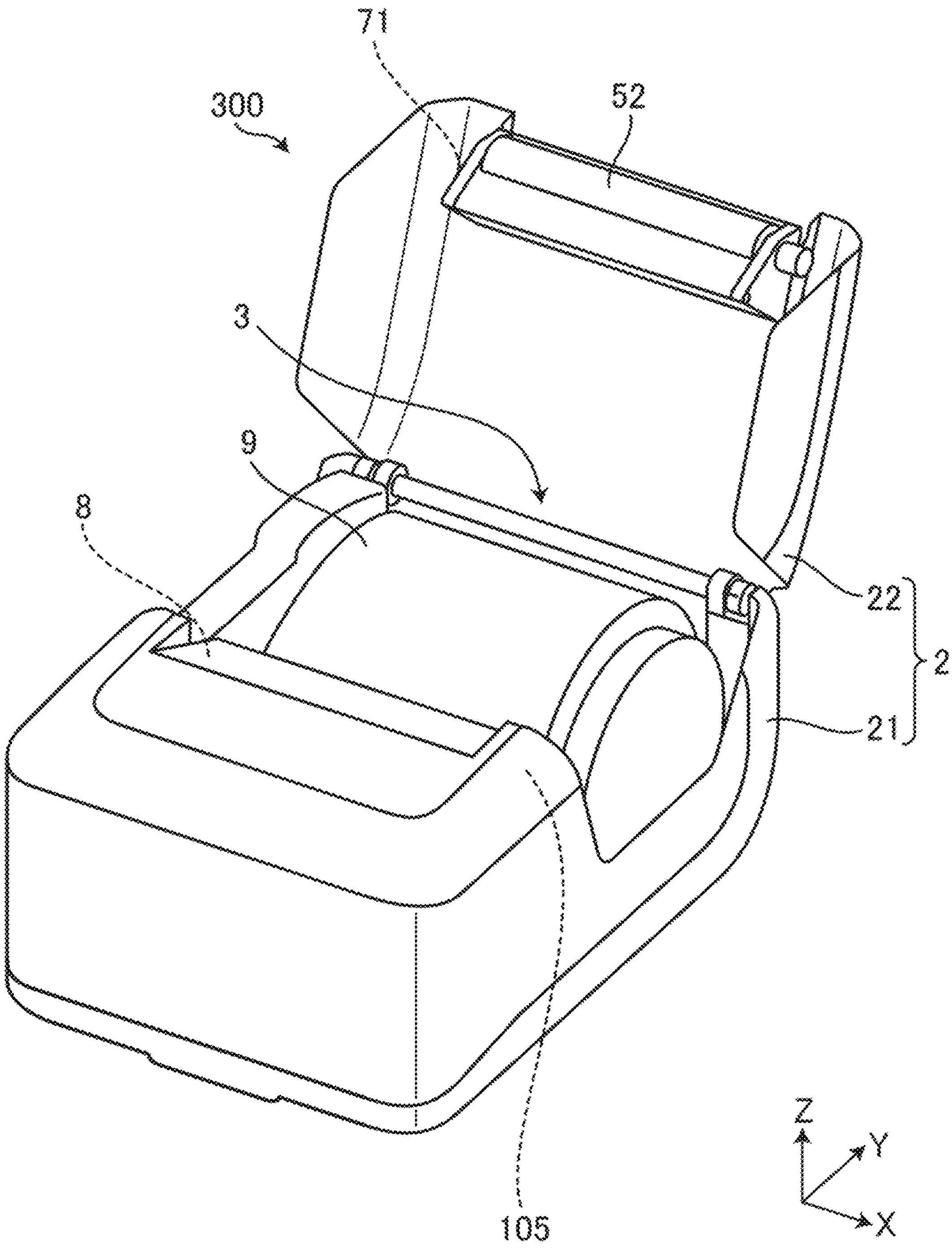
FIG. 12 is a perspective view of an external appearance of a printer according to a second variation of the embodiment in which a lid of a housing is opened.
Figure 13:
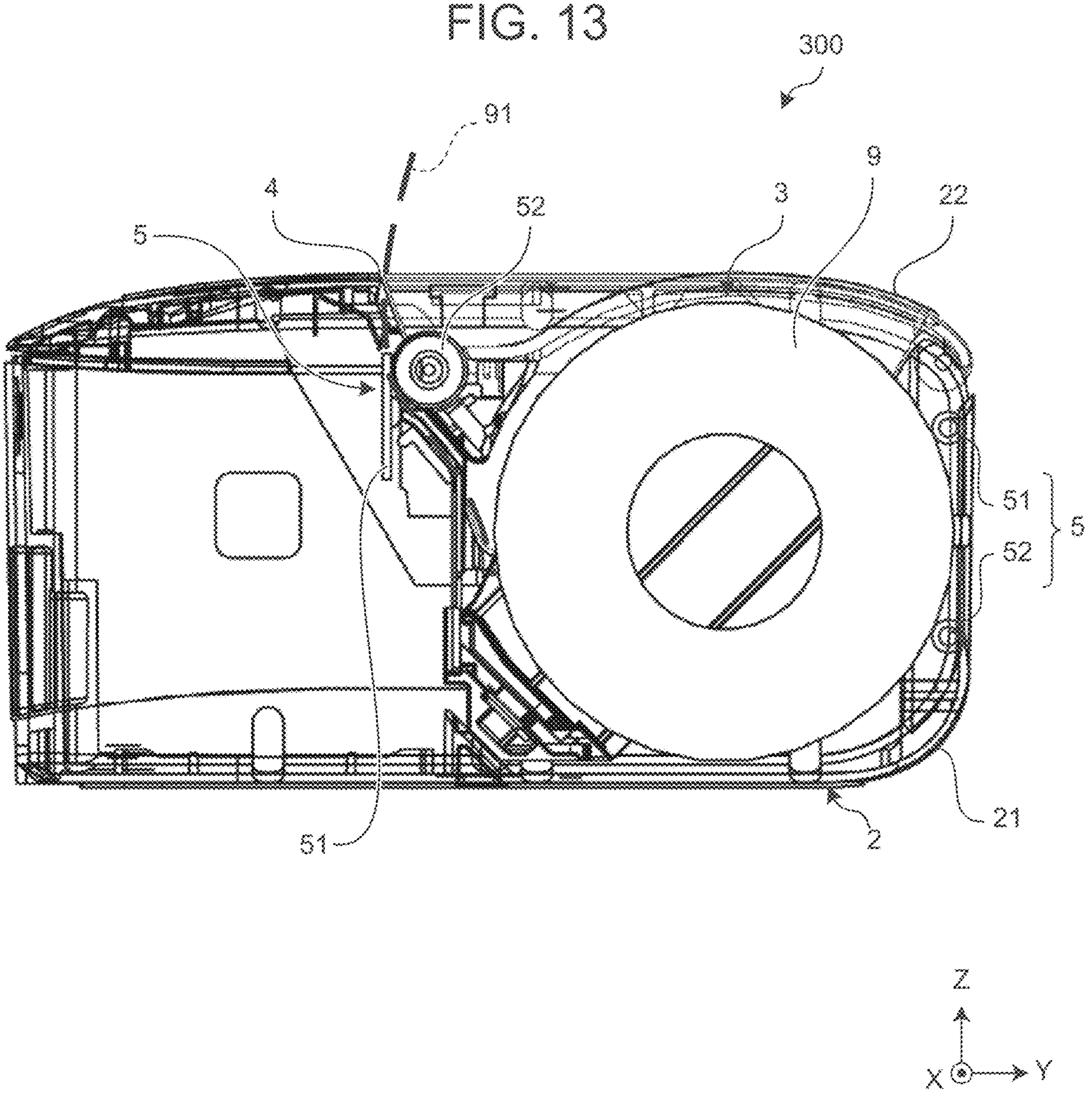
FIG. 13 is a schematic cross-sectional view of an internal structure of the printer according to the second variation.

FIG. 12 is a perspective view of an external appearance of a printer 300 according to a second variation of the embodiment and illustrates a state in which the first lid 22 of the housing 2 is open. FIG. 13 is a schematic cross-sectional view of an internal structure of the printer 300 according to the second variation.

The printer 300 is an example of a small printer that does not include the second lid 23. The first lid 22 has a first side that is a rotating side and a second side that is opposite the first side. The sheet discharge port 4 of the printer 300 is formed between the second side of the first lid 22 and the body 21.

In the printer 300, the open/close sensor 105 and the dual-purpose sensor 8 may be used to determine whether the first lid 22 is properly closed.

The open/close sensor 105 and the dual-purpose sensor 8 are provided near the corresponding ends of the sheet discharge port 4 of the body 21. In other words, the open/close sensor 105 and the dual-purpose sensor 8 are disposed near the first end and the second end of the first lid 22, respectively. The first lid 22 includes fins that are located near the first end and the second end of the first lid 22 and to be detected by these sensors.

According to the above configuration of the printer 300 not including the second lid 23, it is possible to use the dual-purpose sensor 8 to detect a paper jam and the opening and closing of the first lid 22 at the ends in the width direction of the first lid 22.

Third Variation

In the above embodiment and the variations, an abnormal state is detected when the light receiver of a light sensor (each of the dual-purpose sensor 8 and the open/close sensor 105) detects light (that is, in the light transmitting state). However, the present disclosure is not limited to this example. In a third variation of the embodiment, an abnormal state is detected when the light sensor does not detect light (that is, in the light shielding state).

Fourth Variation

In the above-described embodiment and variations, the movable part 7 is configured to rotate. Alternatively, the movable part 7 may be configured to slide as described below with reference to FIGS. 14 and 15.

Figure 14:
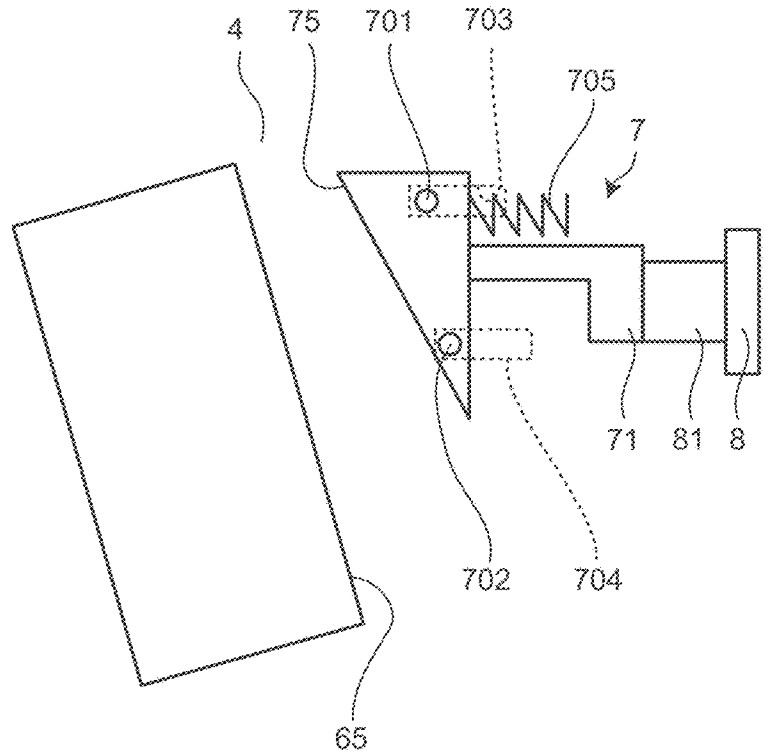
FIG. 14 is a diagram for describing a movable part according to a fourth variation of the embodiment.
Figure 15:
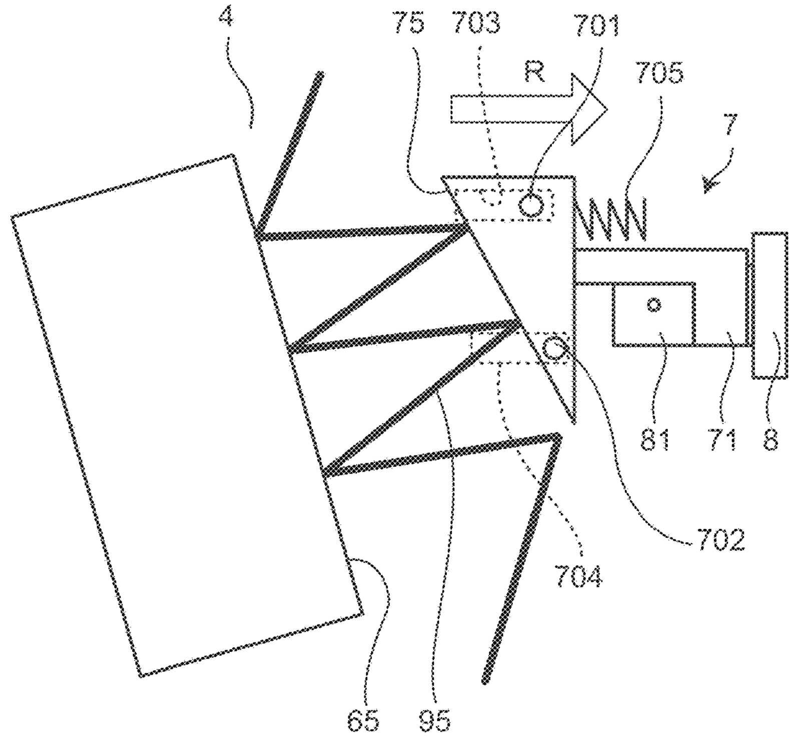
FIG. 15 is a diagram for describing the movable part according to the fourth variation.

FIG. 14 and FIG. 15 are diagrams for describing the movable part 7 according to a fourth variation of the embodiment. FIG. 15 shows a state in which a paper jam has occurred.

In FIGS. 14 and 15, a reference number 65 indicates a sheet guide of the cutting unit 6. The sheet guide 75 is disposed to face the sheet guide 65. The sheet guide 65 and the sheet guide 75 form a part of a path along which the sheet 91 is conveyed.

The movable part 7 of the fourth variation has a structure formed by combining the sheet guide 75 and the fin 71, and the sheet guide 75 includes two protrusions 701 and 702. The body 21 has rails (or grooves) 703 and 704.

The rails 703 and 704 extend in a direction in which the fin 71 enters and exits the slit 81. The rails 703 and 704 support the protrusions 701 and 702 such that the protrusions 701 and 702 can move (or slide) along the rails 703 and 704. That is, the protrusions 701 and 702 are guided by the rails 703 and 704.

With this configuration, when a paper jam occurs, the sheet guide 75 is pushed by the jammed sheet 95, the fin 71 moves through the slit 81 along the rails 703 and 704, and the state of the dual-purpose sensor 8 changes from the on state to the off state. As a result, a paper jam is detected.

Programs to be executed by the apparatuses of the above-described embodiment and variations may be stored in, for example, a ROM in advance. Programs to be executed by the apparatuses of the above-described embodiment and variations may be provided in a non-transitory computer-readable storage medium, such as a CD-ROM, a flexible disk (FD), a CD-R, or a Digital Versatile Disk (DVD), in an installable format or an executable format.

Also, programs to be executed by the apparatuses of the above-described embodiment and variations may be stored in a computer connected to a network, such as the Internet, and may be downloaded via the network. Furthermore, programs to be executed by the apparatuses of the above-described embodiment and variations may be distributed via a network, such as the Internet.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A printer comprising:

a body including a holder that holds a strip-shaped sheet and having an opening;

a lid one side of which is rotatably supported along an edge of the opening and that is rotated to open and close the opening, a sheet discharge port being formed between the lid and a part of the body when the lid is in a closed position to close the opening, the lid having a first end and a second end opposite the first end in a width direction of the lid;

a printing mechanism that performs printing on the sheet;

a first sensor that is disposed closer to the first end of the lid than to the second end of the lid and is capable of detecting whether the first end of the lid is in the closed position;

a movable part that is provided on one of the lid and the body and moves when pressed by the sheet jammed in a section between the printing mechanism and the sheet discharge port; and a second sensor that is provided on another one of the lid and the body at a position closer to the second end of the lid than to the first end of the lid and is capable of detecting that the second end of the lid is not in the closed position and the movable part is moved.

2. The printer according to claim 1, further comprising:

a processor configured to determine whether the printing by the printing mechanism is in progress upon receiving a signal from the second sensor, determine that a paper jam has occurred when the printing is in progress, and determine that the second end of the lid is not in the closed position when the printing is not in progress.

3. The printer according to claim 2, further comprising:

a notification device, wherein the processor is configured to control the notification device to notify of the paper jam or that the second end of the lid is not in the closed position.

4. The printer according to claim 1, further comprising:

a cutting mechanism that is disposed between the printing mechanism and the sheet discharge port and cuts the sheet, wherein the lid covers the cutting mechanism.

5. The printer according to claim 4, further comprising:

a motor that drives the cutting mechanism; and a processor, wherein the cutting mechanism includes a fixed blade and a movable blade that faces the fixed blade, and the processor is configured to control the motor to move the movable blade toward the fixed blade to cut the sheet.

6. The printer according to claim 5, wherein the processor is configured to control the motor to drive the cutting mechanism in one of a full-cut mode in which a portion of the sheet is fully cut off and a partial-cut mode in which the portion of the sheet is partially cut off.

7. The printer according to claim 6, wherein the movable blade has a V-shaped cutting edge, and in the partial-cut mode, the processor controls the motor to stop the movable blade at a position at which a valley of the V-shaped cutting edge does not reach a cutting edge of the fixed blade.

8. The printer according to claim 1, wherein the lid opens and closes the holder.

9. The printer according to claim 1, wherein the movable part includes a sheet guide that guides the sheet, and the movable part rotates when the sheet guide is pressed by the jammed sheet.

10. The printer according to claim 9, wherein the movable part further includes a rotation shaft around which the movable part rotates, and the rotation shaft is located below the sheet guide.

11. The printer according to claim 9, wherein the movable part further includes a rotation shaft around which the movable part rotates, and the rotation shaft is located above the sheet guide.

12. The printer according to claim 1, wherein the movable part includes a sheet guide that guides the sheet, and the movable part slides when the sheet guide is pressed by the jammed sheet.

13. The printer according to claim 12, wherein
the movable part includes a protrusion, and
the body includes a rail that slidably supports the protrusion.

14. The printer according to claim 1, wherein
the lid includes a detection part that is located closer to the first end of the lid than to the second end of the lid and is detectable by the first sensor, and
the movable part includes a detection part that is located closer to the second end of the lid than to the first end of the lid and is detectable by the second sensor.

15. The printer according to claim 14, wherein
the second sensor includes a light emitter and a light receiver that face each other across a slit, and
the detection part of the movable part enters and exits the slit.

16. The printer according to claim 15, wherein
the second sensor outputs a signal when the detection part of the movable part is in the slit.

17. The printer according to claim 1, wherein
the movable part includes a sheet guide that guides the sheet, and
the sheet guide extends in a width direction of the sheet and has a length greater than or equal to a width of the sheet.

18. The printer according to claim 1, wherein
the printing mechanism includes a print head and a platen, and
the platen is rotatably attached to the lid.

19. The printer according to claim 1, wherein
the sheet discharge port is formed between the lid and the body.

20. The printer according to claim 1, further comprising:
a cutting mechanism that is disposed between the printing mechanism and the sheet discharge port and cuts the sheet; and
another lid one side of which is rotatably supported along an edge of another opening of the body and that is rotated to open and close said another opening, wherein
the lid covers the cutting mechanism,
said another lid opens and closes the holder, and
the sheet discharge port is formed between the lid and said another lid.

* * * * *